Aug. 16, 1955     F. TSCHAPPU     2,715,254
SLIDING CLASP FASTENERS
Filed Nov. 19, 1952
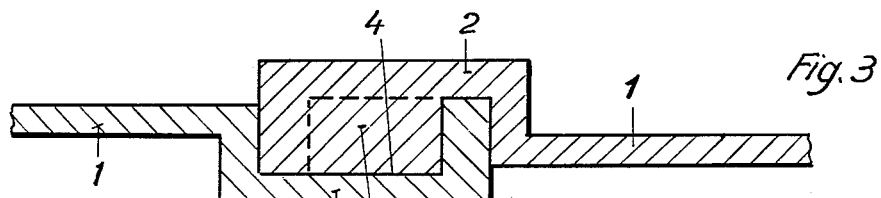
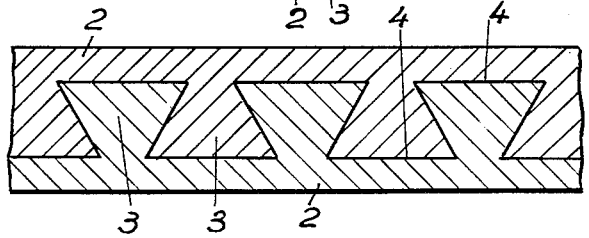
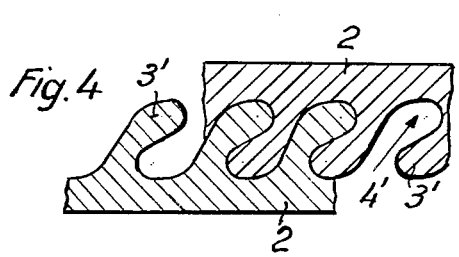
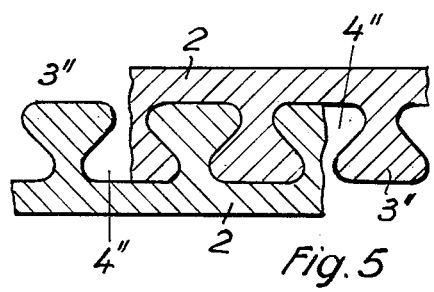
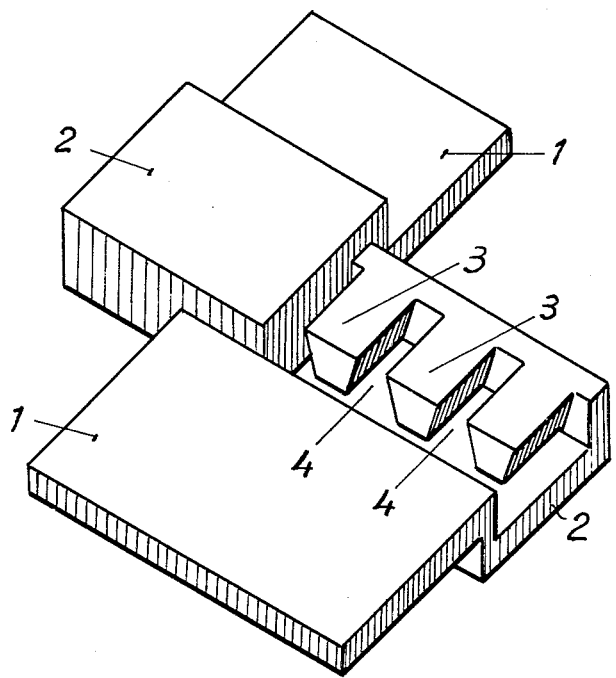
INVENTOR:
FRANZ TSCHAPPU
BY *A. John Michel*
ATTORNEY

United States Patent Office 2,715,254
Patented Aug. 16, 1955

2,715,254

SLIDING CLASP FASTENERS

Franz Tschappu, Zurich, Switzerland

Application November 19, 1952, Serial No. 321,302

3 Claims. (Cl. 24—205.12)

A sliding clasp fastener is known which comprises two flexible fastener strips made of rubber. Of these fastener strips, one has an anchor-shaped cross-section and the other has a tongs-like cross-section with hook-shaped flanged-over side ends which are intended to hook into the hooks of the anchor-shaped cross-section when the sliding clasp fastener is closed and the anchor-shaped cross-section of the former fastener strip lies in the tongs-like cross-section of the latter fastener strip. This known sliding clasp fastener has, owing to the elasticity of the material, the disadvantage that it is impossible to produce small fasteners, since, on the occurrence of transverse strains, the anchor-shaped cross-section is very liable to leave the tongs-like cross-section when it is not desired that it should do so, as experience has shown. Another disadvantage is that the fastener strip with the anchor-shaped cross-section may be displaced in the longitudinal direction of the fastener strip with the tongs-like cross-section, so that a fixing of the mutual position of the two fastener strips is impossible. These disadvantages have the effect of very greatly restricting the possibility of construction and use of this known sliding clasp fastener.

The subject matter of the present invention is a sliding clasp fastener which comprises two fastener strips made of elastic, flexible material, in which the disadvantages of the known construction are obviated. This result is obtained by reason of the fact that the two fastener strips are each provided with a longitudinal groove into which, from one side, at equal distances from one another, projections, which extend transversely of the longitudinal direction of the fastener strip, project with a cross-section that narrows towards the base of the groove and the interspaces between consecutive projections have the same cross-section as the projections.

The invention is illustrated by way of example by the accompanying drawings, of which Fig. 1 is a perspective view of a part of a sliding clasp fastener, Fig. 2 is a cross-section and Fig. 3 is a longitudinal section, while Figs. 4 and 5 are cross-sections of two partly modified embodiments.

The sliding clasp fastener shown in Figs. 1 to 3 comprises two like fastener strips 1, each of which has, along one edge, a longitudinal groove 2 and projections 3 which are at equal distances from one another and extend transversely of the longitudinal direction of the fastener strip and snap into the longitudinal grooves. The cross-sections of these projections 3 are trapezoidal, narrowing towards the bases of the grooves. The interspaces 4 between the projections 3 have the same cross-section as the latter, so that the projections 3 on a fastener strip can, for the purpose of closing the sliding clasp fastener, be inserted in the interspaces 4 on the other fastener strip.

For the purpose of opening and closing the sliding clasp fastener, there is provided a slider (not shown) which is guided along the thickened portions of the sliding clasp fastener which contain the longitudinal grooves 2, and is formed in such a manner that, on being displaced, the two fastener strips are arcuately moved apart out of their plane, as is the case in known sliding clasp fasteners. The interspaces are thus widened and the projections can, in accordance with the direction of movement of the slider, leave the interspaces for the purpose of opening the sliding clasp fastener or enter the interspaces for the purpose of closing the sliding clasp fastener.

Instead of trapezoidal projections 3 and interspaces 4, hook-shaped projections 3' and hook-shaped interspaces 4' may be provided, as shown in Fig. 4, or the projections 3" and the interspaces 4" may have a mushroom-shaped cross-section (Fig. 5). The cross-sectional shape of the projections and of the interspaces may also be different from those represented.

With the cross-section of the fastener strips according to the invention, the projections that project into the longitudinal grooves effect a firm anchoring of the two fastener strips of the closed sliding clasp fastener. This anchoring prevents an undesired detachment of one fastener strip from the other, even when transverse strains occur or a longitudinal displacement of one fastener strip in relation to the other takes place.

What I claim is:

1. A separable interlocking fastener comprising, in combination, two symmetrical fastening elements of flexible material with overlapping edges, each fastening element consisting of a tape carrying a series of transverse, uniformly spaced projections having a narrowed base, the projections being arranged in a longitudinal groove along the edge of each tape, the projections and the spaces therebetween being congruous, whereby the projections of one tape are adapted to interlock transversely with the projections of the other tape, and the projections being spaced from an adjacent longitudinal side wall of the longitudinal groove to leave a longitudinal recess wherein a corresponding side wall of the longitudinal groove of the symmetrical fastening element fits.

2. A separable fastener as defined in claim 1, wherein each series of transverse projections is connected to one longitudinal side wall of the groove.

3. A separable fastener as defined in claim 2, wherein each fastening element is a one-piece member.

References Cited in the file of this patent

UNITED STATES PATENTS

| 2,013,071 | Sipe | Sept. 3, 1935 |
| 2,061,680 | Sipe | Nov. 24, 1936 |
| 2,077,350 | Sundback | Apr. 13, 1937 |
| 2,087,456 | Sundback | July 20, 1937 |
| 2,191,874 | Winterhalter | Feb. 27, 1940 |